July 18, 1950
J. M. SHOEMAKER
2,515,475
HYDRAULIC POWER BOOSTER FOR
AIRCRAFT SURFACE CONTROL
Filed Sept. 19, 1944
3 Sheets-Sheet 1
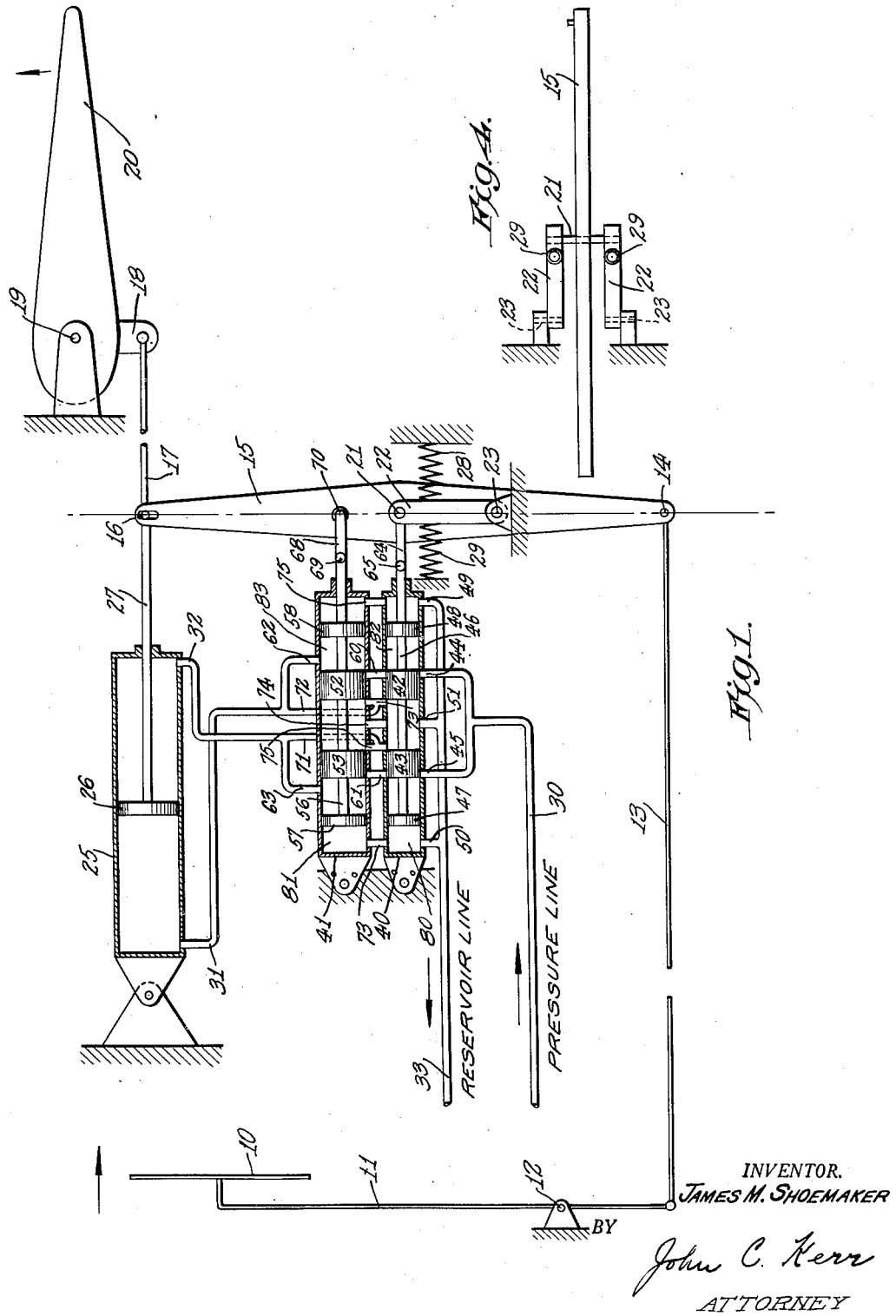
INVENTOR.
JAMES M. SHOEMAKER
BY
John C. Kerr
ATTORNEY INVENTOR.
JAMES M. SHOEMAKER
BY
John C. Kerr
ATTORNEY

IN THE GRAPH:

$v$ = airspeed $\theta$ = angular displacement of control surface $F$ = total force on control surface.

$f$ = arbitrary value of $F$ $\Delta f$ = force taken by booster $f - \Delta f$ = force taken on control column by pilot Patented July 18, 1950

2,515,475

UNITED STATES PATENT OFFICE 2,515,475

HYDRAULIC POWER BOOSTER FOR AIRCRAFT SURFACE CONTROL

James M. Shoemaker, Nichols, Conn., assignor to United Aircraft Corporation, East Hartford, Conn., a corporation of Delaware Application September 19, 1944, Serial No. 554,732

11 Claims. (Cl. 244—85)

This invention relates to the control of aircraft surfaces such as elevators, rudders or ailerons and more particularly to booster mechanisms for assisting the manual operation of these surfaces by an operator. Various booster mechanisms are known of the type wherein the auxiliary source of power takes over the complete manipulation of the aircraft surface either immediately upon the actuation of a manual member by the operator or after a certain degree of operation of the manual member. In either of these cases it is found that the feel of the control is lost to the operator and this is an extremely undesirable result because it is highly desirable for the operator to retain the feel of the control at all times.

It is one of the principal objects of this invention to provide a booster mechanism which will become effective only after a predetermined load is offered by the surface to be controlled, this load being determined by selecting the critical air speed which, with the surface at full deflection, will produce the maximum stick force to which it is desired to subject the pilot. Thus up to a certain predetermined air speed the manual control is effective throughout the full range of surface deflection and the operator, of course, then retains full and complete control and feel of the aircraft surfaces. When the predetermined air speed is exceeded, the booster mechanism becomes operative.

It is a further object of my invention to provide an arrangement as described above wherein the booster mechanism becomes operative only after a predetermined air speed of the aircraft has been attained and characterized by the fact that the booster mechanism applies only sufficient additional operative force to that which it is desired to have applied by the pilot to accomplish the desired movement of the aircraft surface, the pilot thus retaining a feel which is a function of the angle of the control surface, i. e. in the speed range in which the booster is effective, the feel, due to that portion of the total load transmitted to the stick, will always be the same for a given angle of surface deflection irrespective of variations in air speed.

Further objects and advantages of this invention will become apparent in the following detailed description thereof.

In the accompanying drawings:

Figure 1 is an assembly view partly section vertically and partly diagrammatic, illustrating one form of my invention as applied to the control of an aircraft surface;

Fig. 4 is a side view of a detail of the means for mounting the floating lever.

Figure 3:
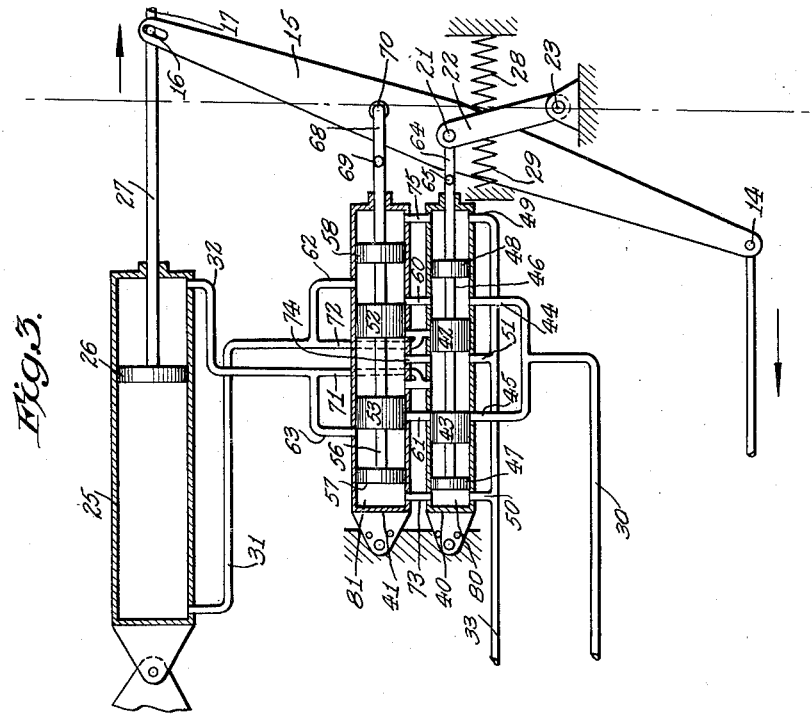
Fig. 3 is a view similar to Figs. 1 and 2, showing the parts in still another operative position in which the surface is deflected and increased air speed has caused the boost to become effective.

Referring to Fig. 1 of the drawings, I have shown the invention as applied to the control of an aircraft movable surface 20 such as an elevator. This invention may similarly be applied, by appropriate linkage, to the control of other aircraft movable surfaces as ailerons or rudders. Said surface may be operated from the pilot's control wheel 10, mounted on control column 11 which is pivoted at 12 to move a link 13 connected at 14 to the lower end of a lever 15 having connected to its upper end 16 a link 17 pivoted to a bell crank 18 fixed to the movable member 20 which is pivoted for movement around a fixed pivot 19. By this arrangement movement of control column 11 in a clockwise direction, for example, as shown by the arrow will result in movement of the surface 20 in a counter-clockwise direction as indicated by the arrow. Movement of the link 17 which overcomes the resistance offered by the surface 20 as the result of the aerodynamic load on the surface, may be assisted by means of a booster or servomotor mechanism including a power cylinder 25 within which operates a piston 26 whose piston rod 27 is pivotally connected at its outer end at pivot 16 so that the power movements of the piston 26 will assist the movements of link 17 in one direction or the other depending upon the direction in which power from a suitable power source is supplied to the pressure cylinder 25. This source of power may comprise a fluid pressure line 30 which supplies power to one end or the other of the pressure cylinder on one side or the other of piston 26 by means of conduits 31 and 32. The supply of fluid pressure from the pressure line 30 to the pressure cylinder 25 may be controlled by suitable valve means to be described hereinafter and the return from said pressure cylinder may be delivered to a reservoir line 33 leading to the fluid reservoir.

The lever 15 is mounted for movement around a pivot 21 but this pivot is not fixed in the fixed frame of the aircraft but rather is floatingly mounted to permit bodily movement of the lever 15 to the right or the left in Fig. 1. For this purpose the pivot 21 is supported in a pair of links 22 on opposite sides of the lever, said links supporting said pivot 21 at their upper ends and being pivoted at their lower ends at 23 in the fixed frame of the machine. The links 22 are held yieldingly in normally balanced poistion by pairs of springs 28 and 29.

Figure 2:
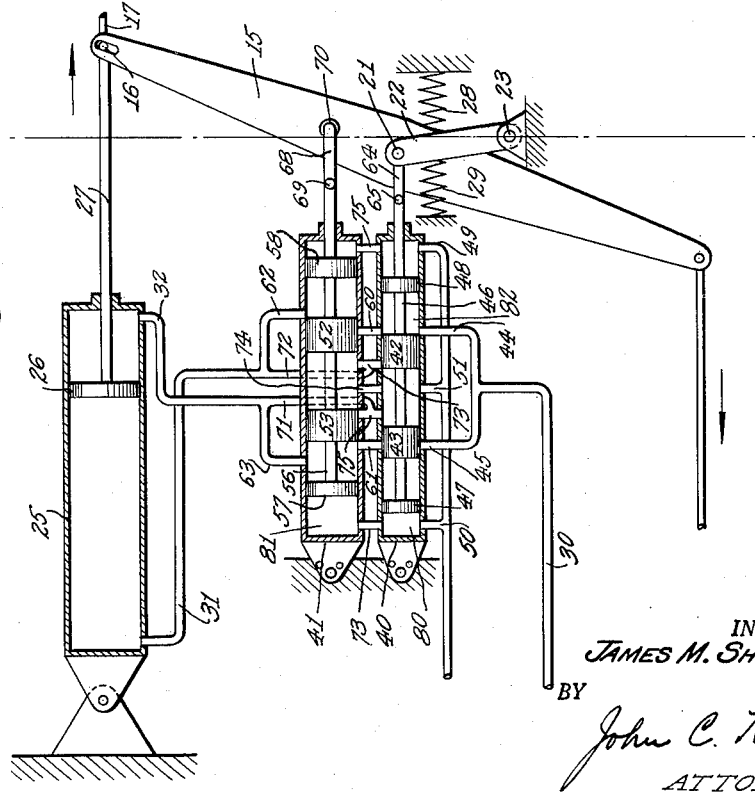
Fig. 2 is a view similar to Fig. 1, showing the parts in a different operative position in which the surface has been deflected by the stick but is not moving at a sufficient speed to require boost.

When the control column 11 is operated, the lever 15 is rotated around its pivot 21 but force is applied at pivot 14 at the lower end of the lever and resistive force is applied in the same direction at pivot 16, at the upper end of the lever, tending to move the lever 15 bodily in one direction or the other depending upon the direction of movement of the control column 11. Thus, the force applied to give clockwise movement of column 11, acting, through linkage 13, 15 and 17, against the resistance of surface 20, results in force applied to the left at pivot 14 and a resistive reaction also toward the left at pivot 16. The resistive reaction at pivot 16 added to the pull at pivot 14 urges links 22 against springs 29, thus allowing lever 15 to be carried bodily to the left, the links 22 pivoting around their pivots 23 as shown in Fig. 2.

The valve means for controlling the fluid pressure entering the power cylinder comprises two auxiliary cylinders 40 and 41 mounted on the fixed frame of the aircraft. Within cylinder 40 there is provided a pair of balanced piston valves 42 and 43, cooperating with ducts 44 and 45 leading from the pressure line 30 and arranged so that ducts 44 and 45 are just closed by valves 42 and 43 in the Fig. 1 position of the parts in which surface 20 and the control column 11 are in their neutral positions. The valves are oppositely acting and mounted on piston rod 46 so that movement of said piston rod to the left opens one of said ducts or ports 44 leading into the cylinder 40 while movement of the piston rod in the other direction opens the other duct or port 45 leading into the cylinder 40. Balancing pistons 47 and 48 are provided on said piston rod and return ducts 49, 50 and 51 leading into the return reservoir line 33 are also provided.

While movement of the piston rod 46 will connect the pressure line with the interior of cylinder 40, it will not alone serve to connect the pressure line with the conduit 31 or 32 because there is interposed between the cylinder 40 and the pressure lines 31 and 32 the second cylinder 41 which is provided with a pair of piston valves 52 and 53 mounted on a piston rod 56 which also carries balancing pistons 57 and 58. Conduits 60 and 61 connect similar ports of cylinders 40 and 41. Ducts 62 and 63 extend from the cylinder 41 into the conduits 31 and 32. The piston rod 46 of cylinder 40 is connected to pivot 21 by means of links 64 pivoted to rod 46 at 65 while the piston rod 56 is connected to the lever 15 at a point 70 spaced from pivot axis 21. The connection between piston rod 56 and lever 15 is accomplished through links 68 connected to piston rod 56 at 69. Return conduits 71, 72, 73, 74 and 75, all connecting with the reservoir line 33, are provided.

From the above description it will be seen that in order to establish connection between the pressure line 30 and conduit 31 it is necessary for piston 42 to uncover duct 44 and for piston 52 to uncover duct 60 so that the fluid pressure may enter duct 62 leading into conduit 31. It will also be apparent that in order for fluid pressure to enter conduit 32 it is necessary for piston 43 to uncover duct 45 and for piston 53 to uncover duct 61 in order that the fluid pressure may enter duct 63 leading into conduit 32. In other words, before the power cylinder can become effective, valves 42 and 52 must both be moved toward the left from the position shown in Fig. 1 or pistons 43 and 53 must both be moved toward the right.

It is now possible to describe the functioning of the device whereby until a certain predetermined load on the control surface for a given angular displacement is attained, the manual control alone is effective, but when this load is exceeded, the power booster becomes effective. For example, assume that column 11 is operated in a clockwise direction as shown by the arrow. The lever 15 will be rotated in a clockwise direction and the member 20 will be operated in a counterclockwise direction. At the same time, the force on pivot 14 is toward the left and the reaction of the load on pivot 16 is also toward the left. This combination of force and resistive reactance results in bodily movement of the pivot 21 and the lever 15 carried thereby toward the left as shown in Fig. 2. Movement of pivot 21 toward the left moves piston rod 46 toward the left and causes piston 42 to uncover port 44 which supplies the fluid pressure from supply line 30. In this case fluid under pressure enters chamber 22 within the cylinder 40 but is unable to enter duct 62 and conduit 31 leading to the power cylinder because piston rod 56 has not moved in the direction which would cause piston 52 to uncover duct 60. The reason for this is that the clockwise rotation of lever 15 for the particular control surface displacement has moved pivot 70 toward the right a distance at least equal to or greater than the bodily movement of lever 15 toward the left. Stated in other words, the manual force applied by the operator on the control column against the resistance of surface 20 was sufficient to attain the desired deflection of surface 20 without causing lever 15 to be shifted bodily sufficiently far to uncover both ducts. The device is therefore operating in the range where manual control alone is effective.

Figure 5:
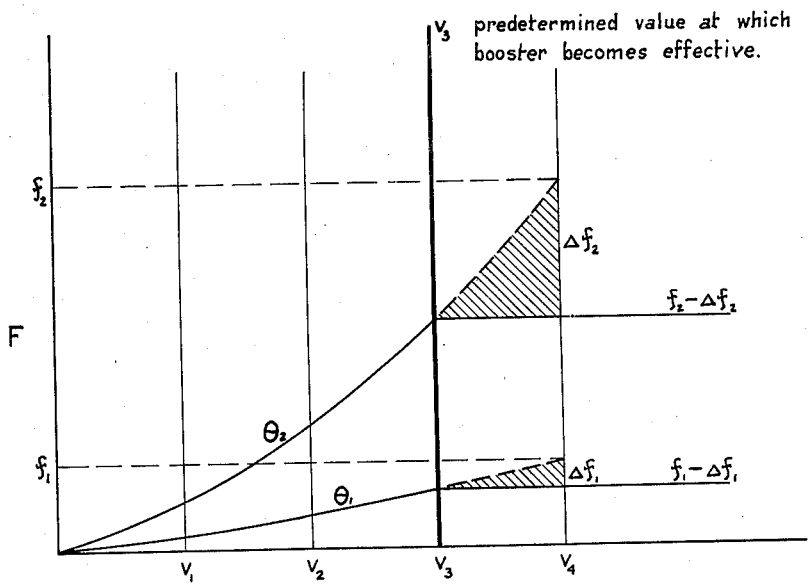
Fig. 5 is an illustration, in graph form, showing the range of operation of my booster mechanism.

As the airspeed of the craft increases, the load on surface 20 and the resistive reaction which it set up increases correspondingly to such an extent that when the operator attempts to apply to column 11 the force necessary to attain a desired angular deflection of the control surface the predetermined force at which the booster becomes effective for that particular angle of deflection of the surface is exceeded and the booster is brought into operation. It will be understood that the magnitude of the predetermined force varies in a given airplane only with angular displacement of the control surface; in application of the invention to a different airplane, however, the predetermined force may have a different preassigned value taken in relation to the total force on the control surface at a selected airspeed, but will still vary with changes in angular displacement of the control surface. It is graphically illustrated in Fig. 5 that the force F which, without the booster, would be required to be applied to the manual control to obtain a desired angular deflection $\theta$ of the control surface is assisted at and over an assigned airspeed $V_3$ by automatic operation of the booster mechanism. The result of the increased force applied by the operator on control column 11 toward obtaining the desired deflection is such that, together with the increased resistive reactance at pivot 16, a sufficient force is applied on pivot 14, to cause the lever 15 to move bodily farther toward the left, as shown in Fig. 3. The result of this additional translational movement to the left of lever 15 together with the pivotal movement required to maintain the desired control surface deflection is such that piston 52 is caused to open port 60 (piston 42 already having opened port 44) to permit the fluid pressure from pressure line 30 to pass through the system into duct 62 and conduit 31 into the left hand side of the power cylinder 25. This will cause the piston 26 and piston rod 27 to be urged to the right and thus assist the operator in actuating member 20 in a counter-clockwise direction.

The above description which illustrated the action of the device in connection with movement of column 11 in a clockwise direction to move member 20 in a counter-clockwise direction will make it readily apparent how the device operates when column 11 is operated in a counter-clockwise direction to operate member 20 in a clockwise direction. In the latter case the bodily movement of lever 15 is toward the right in Fig. 1, which causes piston valve 43 to uncover duct 45 and when further bodily movement of lever 15 to the right takes place, piston valve 53 uncovers duct 61 to permit fluid under pressure to pass into duct 63 and thence into conduit 32 at the right-hand side of the cylinder 25 and piston 26 to urge the piston and the piston rod 27 toward the left.

As hereinabove described, manual operation alone is effective until greater than predetermined resistive reactance is offered by the movable surface 20, whereupon the power booster becomes effective. If sufficient power were supplied by the booster to alone perform the necessary function, the tendency would be for the operator to lose the feel of the control. Therefore, this device is constructed to operate so that the booster mechanism supplies only enough power which, when added to the predetermined power supplied by the operator for any desired control surface deflection, will perform the necessary controlling operation. Thus when the power booster becomes effective, the resistive reactance on pivot 16 is partly overcome by the power mechanism and consequently the force applied by the operator to the pivot 14 is similarly reduced. Thus in the example where operating column 11 is moved in a clockwise direction the force on pivot 14 is toward the left and the resistive reactance on pivot 16 is toward the left. The power booster, however, operates on pivot 16 toward the right and thus reduces the resistive reactance while at the same time the operator needs only to maintain sufficient force on control column 11 and hence on pivot 14 to maintain the control surface at the desired angular displacement and therefore the lever 15 can now move toward the right. This tends to move piston valve 52 in a direction which will partly cover duct 60 and thus reduce the amount of power supplied to the booster and hence the amount of power which the booster applies to pivot 16. Thus there is obtained an equilibrium in which the predetermined force applied by the operator plus the force applied by the power booster just equals the force necessary to accomplish actuation of the controlled member 20. In this manner the operator is at all times in complete control of the control surfaces and the feel of the control is never lost.

It will be understood, of course, that when the control mechanisms operate in the other direction the same thing is true, that is, when lever 15 has been moved to the right to cause piston valve 53 to uncover duct 61, power is applied to the piston 26 and piston rod 27 to urge pivot 16 toward the left. This reduces the resistive reactance which controlled member 20 has placed on pivot 16 toward the right and therefore lever 15 will tend to move bodily toward the left to cover duct 61 and reduce the power supplied to booster 25 to such degree that the above described equilibrium of force again prevails. Thus in either direction of operation the operator always applies a force up to a predetermined maximum while the booster supplies only enough force in addition to achieve the necessary equilibrium whereby the operator never loses the feel of the controls.

In accordance with the provisions of the patent statues, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

What is claimed is:

1. A booster control mechanism for an aircraft control system having a movable surface to be controlled, a pilot operated member operatively connected to the surface, a booster servo-motor operatively connected to the surface, and a source of energy for the servo-motor, said control mechanism comprising a floating control member having connections at spaced points thereon to said surface and to said pilot operated member respectively, supporting means for urging said control member into an intermediate position thereof, and two control elements for jointly controlling the supply of energy from said source to said servo-motor, one of said elements having operative engagement with said control member adjacent said supporting means and the other of said elements having operative engagement with said control member at a point spaced from said supporting means for said member.

2. A booster control mechanism for an aircraft control system having a movable surface to be controlled, a pilot operated member operatively connected to the surface, a booster servo-motor operatively connected to the surface, and a source of energy for the servo-motor, said control mechanism comprising a control member having connections at spaced points thereon to said surface and to said pilot operated member respectively, supporting means for urging said control member into an intermediate position thereof, and means operated upon movement of said control member by said pilot operated member and by said control surface for so controlling the supply of energy from said source to said servo-motor that with increasing angles of deflection of said surface the servo-motor becomes effective at increasingly higher reactive resistance of the control surface, said last mentioned means including two independently operable control elements connected in series between said source of supply and said servo-motor for controlling the supply of energy from said source to said motor, one of said elements being connected to said control member at said pivot, and the other element being pivoted to said control member at a point spaced from said pivot.

3. A booster control mechanism for an aircraft control having a movable surface to be controlled, a pilot operated member operatively connected to the surface, a booster servo-motor operatively connected to the surface, and a source of energy for the servo-motor, said control mechanism comprising a control member having connections as spaced points thereon to said surface and to said pilot operated member respectively, floating pivotal supporting means for said control member between said spaced connections, means for urging said supporting means into an intermediate position thereof, two control elements governing the admission of energy from said source to said servo-motor, and means for operatively connecting said control elements to said control member, one of said control elements being connected closer to said pivotal supporting means than the other.

4. A booster control mechanism for an aircraft control system having a movable surface to be controlled, a pilot operated member operatively connected to the surface, a booster servo-motor operatively connected to the surface, and a source of energy for the servo-motor, said control mechanism comprising a control member having connections at spaced points thereon to said surface and to said pilot operated member respectively, floating pivotal supporting means for said control member between said spaced connections, means for urging said supporting means into an intermediate position thereof, and two control elements for jointly controlling the supply of energy from said source to said servo-motor, one of said elements having operative engagement with said control member at said pivotal supporting means, whereby said element is moved to its energy supplying position as a result of floating movement of said pivot, and the other element having operative engagement with said control member at a point spaced from said pivotal supporting means, whereby it is moved away from its energy supplying position by movement of said control member about its pivot and is moved toward said position as a result of floating movement of said pivot.

5. A booster control mechanism for an aircraft control system having a movable surface to be controlled, a pilot operated member operatively connected to the surface, a booster servo-motor operatively connected to the surface, and a source of energy for the servo-motor, said control mechanism comprising a control member having connections at spaced points thereon to said surface and to said pilot operated member respectively, a pivot for said control member between said spaced connections having a floating support permitting bodily movement of said control member, means for urging said pivot into an intermediate position thereof, means for controlling the supply of energy from said source to said servo-motor including two independently operable control elements each of which is separately connected with said control member, one of said elements being connected to said control member closer to the pivot thereof than the other.

6. A control mechanism for an aircraft control system having a movable surface to be controlled, a pilot operated member operatively connected to the surface, a booster servo-motor also operatively connected to the surface, and a source of energy for the servo-motor, said control mechanism comprising a floating control member having connections at spaced points thereon to said surface and to said pilot operated member respectively, a pivot for said control member between said spaced connections having a floating support permitting bodily movement of said control member, means for urging said control member into an intermediate position thereof, means for controlling the supply of energy from said course to said servo-motor including two independently operable control elements, each of which is separately connected with said control member, one of said elements being connected to said control member at said pivot and the other element being pivoted to said control member at a point spaced from said pivot.

7. A booster control mechanism for an aircraft control system having a movable surface to be controlled, a pilot operated member operatively connected to the surface, a booster servo-motor operatively connected to the surface, and a source of energy for the servo-motor, said control mechanism comprising a floating control member having operative connections at spaced points thereon to said surface and to said pilot operated member respectively, a pivotal support for said control member intermediate said spaced points, said support being pivoted adjacent one end thereof on structure fixed relative to the aircraft, resilient means acting on said control member adjacent its pivotal support for urging said member for movement bodily into an intermediate position thereof, and control means having a dual operative engagement with said control member between said spaced connections for controlling the supply of energy from said source to said servo-motor.

8. A booster control mechanism for an aircraft control system having a movable surface to be controlled, a pilot operated member operatively connected to the surface, a booster servo-motor operatively connected to the surface, and a source of energy for the servo-motor, said control mechanism comprising a floating control member having operative connections at spaced points thereon to said surface and to said pilot operated member respectively, a pivotal support for said control member intermediate said spaced points, said support being pivoted on structure fixed relative to the airplane, opposed resilient means acting on said control member adjacent said pivotal support for urging said control member into an intermediate position thereof, and means for controlling the supply of energy from said source to said servo-motor including a first control element having an operative connection with said control member adjacent said pivotal support therefor and a second control element having an operative connection with said control member between the operative connection of said first element and the operative connection of said surface to said control member.

9. A booster control mechanism for an aircraft control system having a movable surface to be controlled, a pilot operated member operatively connected to the surface, a booster servo-motor operatively connected to the surface, and a source of energy for the servo-motor, said control mechanism comprising a floating control lever having an operative connection at one end to said surface and an operative connection at its opposite end to said pilot operated member, a pivotal support for said control lever intermediate its ends, said support being pivoted on structure fixed relative to the airplane, resilient means acting on said control lever adjacent its pivotal support for urging said lever into an intermediate position thereof, two control elements in series for controlling the supply of energy from said source to said servo-motor, and means for operatively connecting said elements to said lever, the connection for one of said elements being more remote from said pivotal support than the other.

10. A booster control mechanism for an aircraft control system having a movable surface to be controlled, a pilot operated member operatively connected to the surface, a booster servo-motor operatively connected to the surface, and a source of energy for the servo-motor, said control mechanism comprising a control member having a combined pivotal and floating support and having operative connections at spaced points thereon to said surface and to said pilot operated member respectively, means including opposed resilient members for urging said control member for bodily movement into an intermediate position thereof, and means for controlling the supply of energy from said source to said servo-motor throughout the entire range of deflection of said surface whenever the relative air speed of said aircraft exceeds a predetermined value including control means having an operative connection with said control member between the support for the latter and the operative connection between said control surface and said control member.

11. A booster control mechanism for an aircraft control system having a movable surface to be controlled, a pilot operated member operatively connected to the surface, a booster servo-motor operatively connected to the surface, and a source of energy for the servo-motor, said control mechanism comprising a floating control member having connections at spaced points thereon to said surface and to said pilot operated member respectively, a pivotal support for said control member intermediate said spaced points, said support being pivoted on structure fixed relatively to the aircraft, resilient means acting on said control member adjacent its pivotal support for urging said control member into an intermediate position thereof, and control means operated upon movement of said control member by said pilot operated member and by said control surface for controlling the supply of energy from said source to said servo-motor including a first control element conditioned for boost by movement of said pilot operated member, and a second control element conditioned for boost by deflection of said surface due to relative air speed of said aircraft, said elements having operative connections with said control member relative to the pivotal support therefor such that movement of said first element by said pilot operated member to condition said first element for boost moves said second element away from the boost position thereof whereby with increasing angles of deflection of said surface the servo-motor becomes effective at increasingly higher reactive resistance of the control surface.

JAMES M. SHOEMAKER.

REFERENCES CITED

The following references are of record in the file of this patent:

UNITED STATES PATENTS

| Number | Name | Date |
|---|---|---|
| 949,559 | Wilson | Feb. 15, 1910 |
| 1,365,347 | Schneider | Jan. 11, 1921 |
| 1,854,226 | Rouse | Apr. 19, 1932 |
| 2,165,451 | Carlson | July 11, 1939 |
| 2,337,706 | Berry | Dec. 28, 1943 |
| 2,352,334 | Macomber | June 27, 1944 |
| 2,360,542 | Berry | Oct. 17, 1944 |
| 2,389,274 | Pearsall | Nov. 20, 1945 |

FOREIGN PATENTS

| Number | Country | Date |
|---|---|---|
| 130,213 | Great Britain | July 31, 1919 |
| 513,267 | France | Oct. 29, 1920 |
| 668,388 | France | July 9, 1929 |